(12) United States Patent
Wang et al.

(10) Patent No.: US 6,498,796 B2
(45) Date of Patent: Dec. 24, 2002

(54) METHOD FOR TANDEM DETECTION AND TANDEM TUNNELING

(75) Inventors: David T. K. Wang, Solana Beach, CA (US); Scott McNeill, San Diego, CA (US)

(73) Assignee: Nuera Communications, Inc., San Diego, CA (US)

( * ) Notice: Subject to any disclaimer, the term of this patent is extended or adjusted under 35 U.S.C. 154(b) by 0 days.

(21) Appl. No.: 09/418,439

(22) Filed: Oct. 18, 1999

(65) Prior Publication Data

US 2002/0097744 A1 Jul. 25, 2002

(51) Int. Cl.[7] .................................................. H04J 3/18
(52) U.S. Cl. ....................................... 370/466; 370/477
(58) Field of Search ........................... 379/93.08, 93.05, 379/93.06, 93.07, 93.09, 93.11; 370/545, 465, 466, 477, 487, 522, 526, 527, 419, 420, 401; 704/500

(56) References Cited

U.S. PATENT DOCUMENTS 5,574,723 A * 11/1996 Killian et al. ............... 370/384
6,021,136 A * 2/2000 Bharucha et al. ........... 370/477

FOREIGN PATENT DOCUMENTS

WO  WO 96/31993  * 10/1996

* cited by examiner

Primary Examiner—Ken Vanderpuye
(74) Attorney, Agent, or Firm—Merle W. Richman, Esq.

(57) ABSTRACT

A method and apparatus of detecting a tandem link and performing tandem tunneling when a tandem link is detected. The detection of a tandem link includes generating a HAIL and ACK signal where a voice compression unit on one end of the link receives the signals and generates an ACK signal for a voice compression unit on the other end of the link when the HAIL signal is detected. The tandem tunneling prevents the VCUs that comprise the tandem link from decompressing packets received on a network link, adds HDLC header information to the packet to generate HDLC framed packets on the subscriber side, removes HDLC header information from HDLC framed packets received on the subscriber side, and passes the unframed packets to the network side.

34 Claims, 5 Drawing Sheets

**FIGURE 5A
(PRIORT ART)**

METHOD FOR TANDEM DETECTION AND TANDEM TUNNELING

BACKGROUND OF THE INVENTION

1. Field of the Invention

This invention relates to a method for preventing multiple stages of compression and decompression in a voice communication system, in particular, in a communication link traversing multiple networks.

2. Description of Related Art

Figure 1:
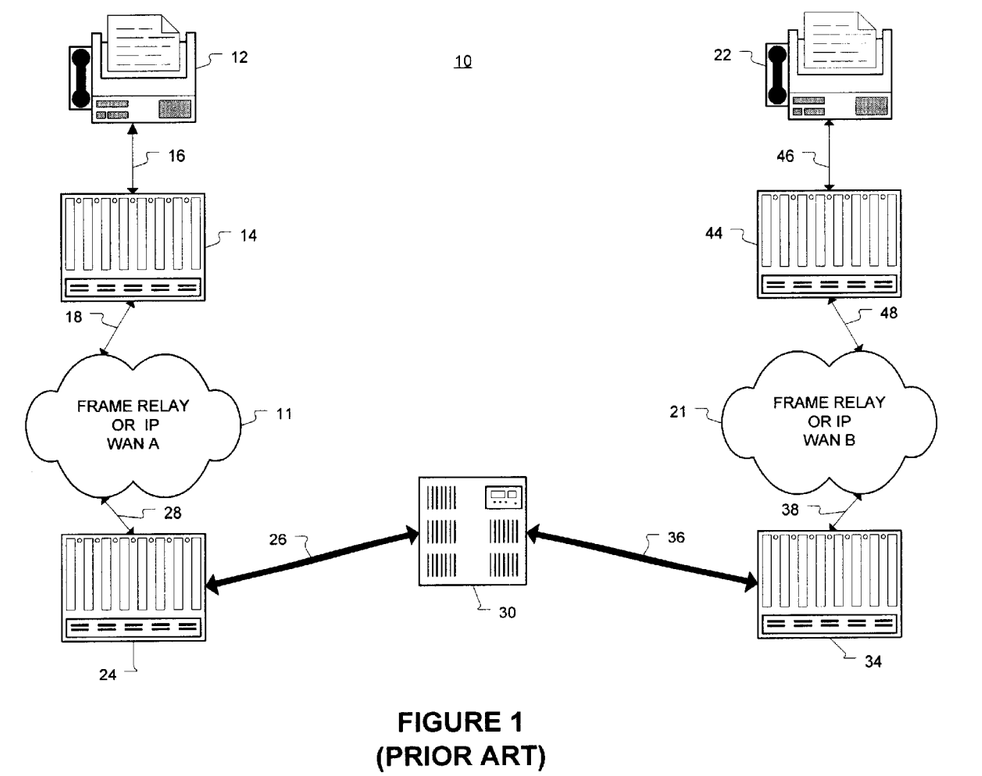
FIG. 1 (PRIOR ART) is a diagram of a prior voice communication system having a tandem voice link between call signal equipment 12 and 22.

In modern voice communication systems, a voice communication link may include one or more wide area networks ("WAN"). The inclusion of a WAN in a voice communication link normally requires equipment to convert a voice signal transmitted on the link to a format acceptable for transmission over the WAN. When a voice communication link includes a plurality of WAN, the quality of a voice signal transmitted thereon may be reduced by multiple conversions of the voice signal to a format for transmission over the WAN as explained with reference to FIG. 1. FIG. 1 (Prior Art) is an example of a voice communication system 10 having a voice communication link that includes a plurality of WAN 11,21.

As shown in FIG. 1, the voice communication system 10 includes call signal equipment 12, 22, two WAN 11, 21, a digital switch 30 and a plurality of Voice Conversion Units (VCU) 14, 24, 34, 44. The call signal equipment 12, 22 may be any equipment that may transmit and receive a voice signal, e.g., a facsimile machine, telephone, modem, or another digital switch or private switching network. The WAN 11, 21 is any network that transmits data packets using any protocol including time division multiplex (TDM), frame relay (FR), or internet protocol (IP). The digital switch 30 is a switch that routes voice signals to one or more locations.

The VCU 14, 24, 34, and 44 converts voice signals received on a subscriber side link 16, 26, 36, and 46 to packet signals that may be transmitted over a WAN on a network side link 18, 28, 38, and 48. The VCU 14, 24, 34, and 44 also converts packet signals received on the network side link 18, 28, 38, and 48 to voice signals that may be transmitted to subscriber equipment on the subscriber side link 16, 26, 36, and 46. Prior to conversion to a packet signal, a voice signal may be a pulse code modulation ("PCM") or other common voice format signal. The PCM voice signal is converted to a plurality of packets to enable the voice signal to traverse the WAN 11, 21. It is noted in order to optimize network bandwidth utilization, the PCM voice signal received on the subscriber side 16, 26, 36, and 46 is compressed prior to conversion to packets for transmission across a WAN 11, 12. Packets signals received on the network side 18, 28, 38, and 48 are decompressed by VCU 14, 24, 34, and 44.

In the voice communication system 10 shown in FIG. 1, the voice communication link between call signal equipment 12 and call signal equipment 22 includes four VCUs 14, 24, 34, and 44, two WAN 11, 21 and a digital switch 30. Thus, a voice signal transmitted from either equipment 12, 22 to the other 22, 12 will be: 1) compressed and converted from a voice signal to a packet signal by VCU 14 or 44; 2) transmitted over a first WAN 11 or 21; converted and decompressed back into a voice signal by VCU 24 or 34; 3) transmitted or switched from one VCU 24 or 34 to another VCU 34 or 24 by digital switch 30; 4) compressed and converted from a voice signal to a packet signal by VCU 34 or 24; 5) transmitted over a second WAN 21 or 11; and 6) converted and decompressed back into a voice signal by VCU 44 or 14 and transmitted to equipment 22 or 12. Consequently, a voice signal transmitted between equipment 11 and 21 will be compressed and decompressed twice, thus, VCU 24, switch 30 and VCU 34 form a "tandem link", which may reduce the voice quality of the voice signal.

Ideally, when a voice signal is compressed and decompressed more than once (a tandem link occurs) in a voice communication link, the extra stages of compression and decompression should be eliminated, i.e., the tandem link should detected and bypassed. However, in order to prevent multiple compressions and decompressions in a voice communication link, the voice communication system 10 must be able to detect when a tandem link (multiple compressions and decompressions) exists in a particular voice communication link. For example, the voice communication system 20 shown in FIG. 2, includes a plurality of WAN 11, 21, but a voice communication link between call signal equipment 12 and 32 or 22 and 32 traverses only a single WAN 11 or 21 and does not include a tandem link.

Figure 2:
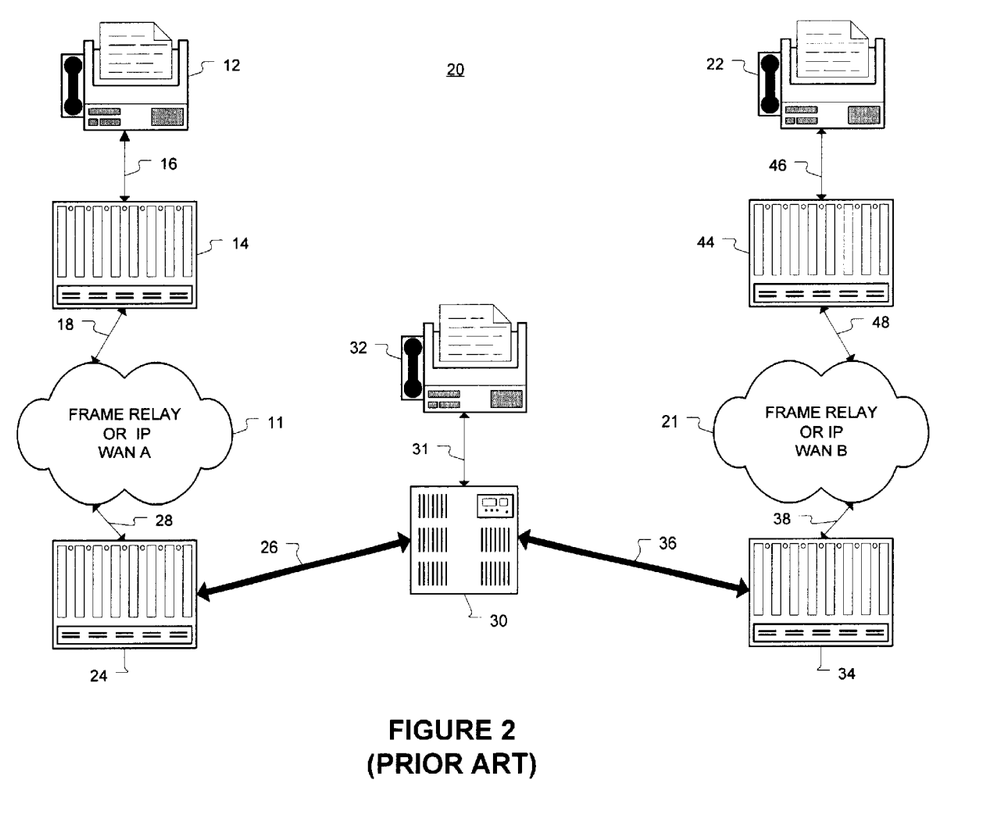
FIG. 2 (PRIOR ART) is a diagram of a prior voice communication system having a tandem voice link between call signal equipment 12 and 22 while not having a tandem link between call signal equipment 12 or 22 and 32.

Thus, a voice signal transmitted from either equipment 12 to 32 or 22 to 32 will be: 1) compressed and converted from a voice signal to a packet signal by VCU 14 or 44; 2) transmitted over a first WAN 11 or 21; converted and decompressed back into a voice signal by VCU 24 or 34; and 3) transmitted or switched from one VCU 24 or 34 to call signal equipment 32 via link 31. Thus, the voice communication link between equipment 12 or 22 and 32 includes only one stage of compression and decompression. Thus, although voice communication system 20 includes two WAN 11, 21, not every voice communication link includes multiple compressions and decompressions. Accordingly, a need exists for a method that detects when a tandem link or multiple compressions and decompressions occur in a voice communication link and prevents the same to improve the voice quality of a voice signal on such a link.

SUMMARY OF THE INVENTION

The present invention includes a method of determining whether a voice communication link between a first subscriber unit and a second subscriber unit in a voice communication system includes a tandem link. The first and second subscriber units transmit and receive a voice signal on the voice communication link. In addition, the voice communication system includes a plurality of voice conversion units where each of the plurality of voice conversion units has a subscriber side link and network link. Each of the plurality of voice conversion units adds a HAIL signal to the voice signal provided on the subscriber side link. They also detect a HAIL signal or an ACK signal in the voice signal received on the subscriber side link. Further, they add an ACK signal to the voice signal provided on the subscriber side link when a HAIL signal or an ACK signal is detected on the voice signal received on the subscriber side link. A tandem link is detected when the ACK signal is detected in the voice signal received on the subscriber side link.

Each of the plurality of voice conversion units may also attempt to detect the ACK signal in the voice signal received on the subscriber side link after generating a voice signal with the ACK signal. In this case, a tandem link is detected when an ACK signal is detected in the voice signal received on the subscriber side link after generating a voice signal with the ACK signal. In a preferred embodiment, the tandem link may be detected when an ACK signal is detected in the voice signal received on the subscriber side link within a predetermined period of time after generating a voice signal with the ACK signal.

In another preferred embodiment, each of the plurality of voice conversion units may attempt to determine if a notch code exists in the received voice signal and avoiding tandem link detection when the notch is detected. The method each unit employs in this case includes attempting to detect whether the voice signal generated to the subscriber side link includes a notch code. Then, removing the notch code from voice signal generated to the subscriber side link when the notch code is detected in the voice signal generated to the subscriber side link and providing the modified voice signal on the subscriber side link. This ensures that each unit generates voice signals to the subscriber without the notch code so other units receiving voice signal without the notch code will know that the sending unit is not performing the same process. Accordingly, each unit also attempts to detect whether the voice signal received on the subscriber side link includes a notch code. In this case, a tandem link is Not detected when a notch code is detected in the voice signal received on the subscriber side link.

In a preferred embodiment, the step of generating a signal with the HAIL signal includes adding a first predetermined DC offset to the voice signal provided on the subscriber side link. Further, the step of generating a signal with the ACK signal includes adding a second predetermined DC offset to the voice signal provided on the subscriber side link. Ideally, the first predetermined DC offset is a positive DC offset and the second predetermined DC offset is a negative DC offset. In this case, the step of detecting a HAIL signal may include averaging the voice signal received on the subscriber side link for a predetermined interval of time. Then, comparing the averaged value of the voice signal received on the subscriber side link with the first predetermined DC offset. Accordingly, detecting a HAIL signal in the voice signal received on the subscriber side link when the averaged value of the voice signal received on the subscriber side link is substantially the same as the first predetermined DC offset.

Also, the step of detecting an ACK signal may include averaging the voice signal received on the subscriber side link for a predetermined interval of time. Then, comparing the averaged value of the voice signal received on the subscriber side link with the second predetermined DC offset. Accordingly, detecting an ACK signal in the voice signal received on the subscriber side link when the averaged value of the voice signal received on the subscriber side link is substantially the same as the second predetermined DC offset. It is noted that ideally the Notch code is the PCM code that most closely corresponds to the first predetermined DC offset.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 3:
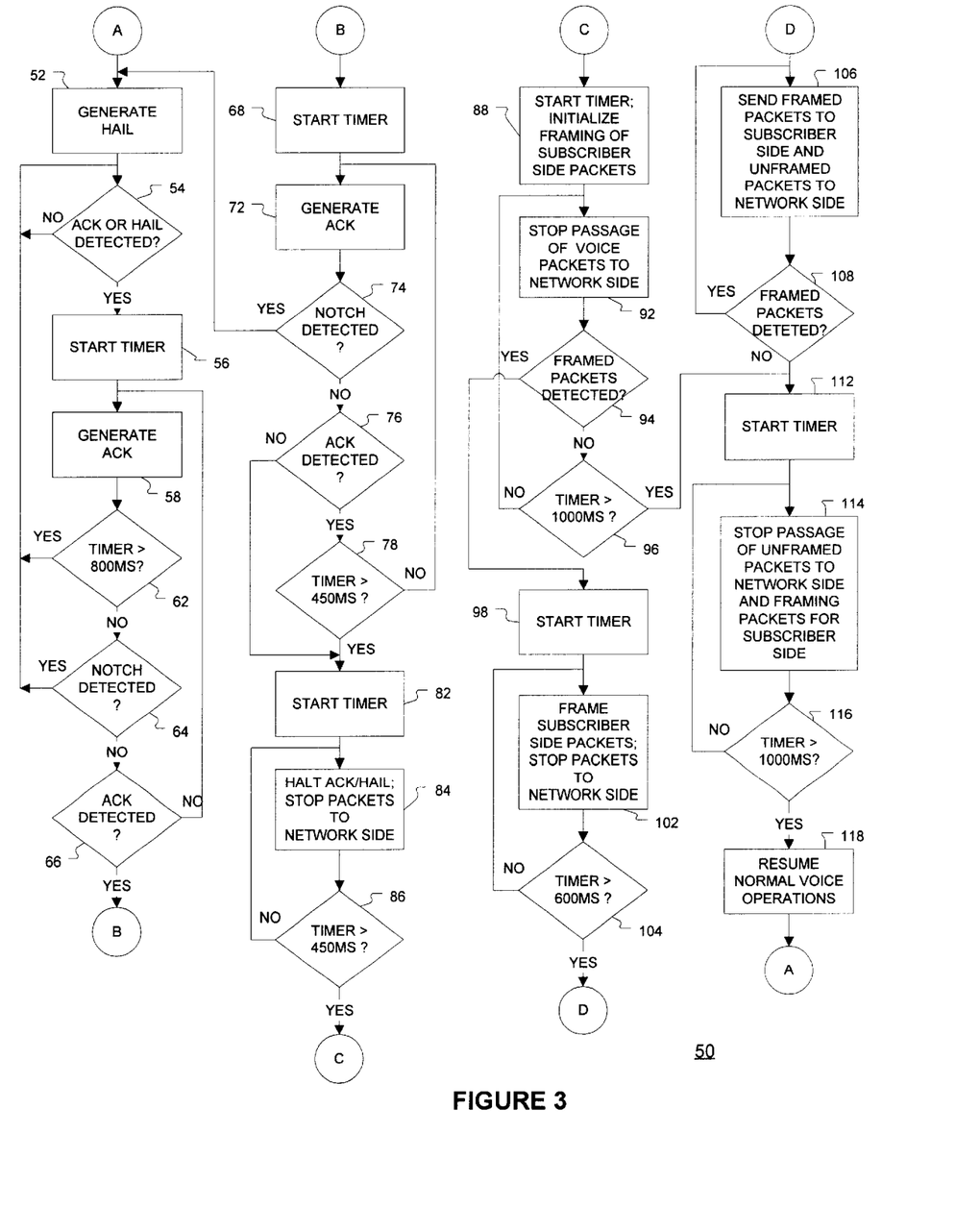
FIG. 3 is a flowchart of a preferred method of detecting tandem links in a voice communication link and performing tandem tunneling to prevent multiple compressions and decompressions of a voice signal on the voice communication link.

As described above and explained with reference to FIGS. 1 and 2, a tandem link may occur in a voice communication system 10 having a plurality of WAN 11, 21 when a voice communication link on the system 10 traverses a plurality of WAN 11, 21 and a voice signal on the link is subject to multiple stages of compression and decompression. FIG. 3 is a flowchart of exemplary method 50 of detecting a tandem link in a voice communication link and eliminating the multiple stages of compression and decompression of a voice signal on such a communication link by performing tandem tunneling. Thus, the method 50 includes two primary steps: 1) detecting when a tandem link exists on a voice communication link (sub-steps 52 to 66); and 2) performing tandem tunneling so multiple stages of compression and decompression are not performed on a voice signal on the voice communication link (sub-steps 68 to 118).

As explained below, in order for the method of the present invention to function the two VCUs that comprise the tandem link must be performing the same or similar process. In the communication system 10 shown in FIG. 1, VCU 24, digital switch 30, and VCU 34 comprise the tandem link, i.e., VCU 24 or 34 decompresses and converts the packetized compressed voice signal to a voice signal prior to transmission to the other VCU 34 or 24 by digital switch 30. The other VCU 34 or 24 recompresses the voice signal and converts the compressed voice signal into a packet signal including a plurality of packets. In order to detect this tandem link in accordance with the present invention, VCU 24 or 34 incorporates a HAIL and ACK signal (step 52) in the decompressed voice signal sent to the digital switch 30 via subscriber side link 26 and 36.

VCU 24 or 34 detects the HAIL signal incorporated in the decompressed voice signal (step 54) and starts a 800 ms timer (step 56) and then generates an acknowledgment signal (ACK) (step 58) that is incorporated in the decompressed voice signal and sent to the digital switch 30 (to the other VCU 34 or 24). The receipt of a HAIL signal by a second VCU indicates that the VCU is linked by subscriber equipment to another VCU so that a tandem link exists between the VCUs. The receipt of the ACK signal by the first VCU indicates that the second VCU is part of a tandem link and the second VCU is performing the same or similar tandem detection and tunneling procedure.

Consider: VCU 24 generates a HAIL signal on link 26 (step 52) (as described above and more detail below) and waits for the detection of a HAIL or ACK signal on link 26 (step 54). Meanwhile, VCU 34 also generates a HAIL signal on link 36 (step 52) and also waits for the detection of a HAIL or ACK signal on link 36. Note: VCU 14 and 44 also generate a HAIL signal on link 16 and 46 (step 52) and wait for the detection of a HAIL or ACK signal on link 16 and 46 (step 54). Because VCU 14 and 44 are coupled to call signal equipment 12 and 22 which do not generate a DC offset under normal operation, the HAIL signal will not be detected by VCU 14 and 44 and VCU 14 and 44 will remain at step 54, awaiting the detection of an ACK or a HAIL signal. VCU 34, however, will detect the HAIL signal in the voice signal generated by VCU 24 and transmitted to VCU 34 via digital switch 30 on link 36.

VCU 34 will then start the 800 ms timer (step 56) and generate a voice signal incorporating an ACK signal (step 58). VCU 34 will then check whether the timer has reached 800 ms (step 62). When the timer has reached 800 ms, the method returns to step 54, awaiting the detection of an ACK or a HAIL signal in the voice signal on link 36. When the timer has not expired (step 62), in a preferred embodiment VCU 34 attempts to detect a Notch code in the voice signal on link 36 (explained in detail below). When the VCU 34 detects that the voice signal includes a Notch code, VCU 24 is not performing the same or similar method (as explained below) and VCU 34 returns to step 54, awaiting the detection of a HAIL or an ACK signal in the voice signal on link 36. When VCU 34 does not detect a Notch code in the signal (step 64), VCU 34 attempts to detect an ACK signal in the voice signal on link 36 (step 66).

When an ACK signal is detected in the voice signal on link 36 by VCU 34 in step 66, VCU 34 has completed the tandem link detection steps of the method and starts the tandem tunneling method of the present invention (steps 68 to 118). Meanwhile, depending on the timing of the link, VCU 24 will detect an ACK or a HAIL signal in the voice signal on link 26 (step 52), and VCU 24 will then start the 800 ms timer (step 56) and generate a voice signal incorporating an ACK signal (step 58). VCU 24 will then check whether the timer has reached 800 ms (step 62). When the timer has reached 800 ms, the method returns to step 54, awaiting the detection of an ACK or a HAIL signal in the voice signal on link 26. When the timer has not expired (step 62), in a preferred embodiment VCU 24 also attempts to detect a Notch code in the voice signal on link 26. When the VCU 24 detects that the voice signal includes a Notch code, VCU 34 is not performing the same or similar method and VCU 24 returns to step 54, awaiting the detection of a HAIL or an ACK signal in the voice signal on link 26. When VCU 24 does not detect a Notch code in the voice signal (step 64), VCU 24 attempts to detect an ACK signal in the voice signal on link 26 (step 66).

When an ACK signal is detected in the voice signal on link 26 by VCU 24 at step 66, VCU 24 has completed the tandem link detection steps of the method and starts the tandem tunneling method of the present invention (steps 68 to 118). At this point, the existence of a tandem link between VCU 24 and VCU 34 has been confirmed. As noted above, a HAIL and ACK signal incorporated in the voice signal is used to inform one of VCU 24 and 34 that they are forming a tandem link. The selected HAIL and ACK signals are ideally sufficiently unique and uncorrelated so that is it unlikely that both signals would occur or exist in a normal voice signal and occur in the proper order whereby the method in accordance with the present invention may mistakenly determines that the VCU is part of a tandem link.

In a preferred embodiment of the invention, the HAIL and ACK signals are DC offsets that are added to the voice signal on the subscriber side link 26, 36 of the VCU 24, 36. Ideally, the DC offsets are separated by a large amplitude to prevent false tandem link detection. In an exemplary embodiment, the HAIL signal is a DC offset of +278 and the ACK signal is a DC offset of −4096. Given the separation of these signals, it is unlikely that these signals would occur randomly in a voice signal and at the appropriate time so the method in accordance with the present invention would determine that the VCU is part of a tandem link. In order to generate a voice signal incorporating the HAIL or ACK signal, the offset is added to the voice signal. In cases where the voice signal is a PCM signal, this process is relatively simple.

The process of detecting these signals is also relatively simple. In one preferred embodiment, the process of detecting a HAIL signal includes averaging the received voice signal over a period of 64 ms (512 samples at a 8 kHz sampling rate). Then the averaged value of the voice signal (representing an estimate of the DC offset of the signal) is compared to the selected DC offset for the HAIL signal, in the preferred embodiment, to +278. When the estimated DC offset is about equal to the HAIL DC offset (within +/−24 in the exemplary embodiment), the method (at step 54) indicates that it has detected a HAIL signal incorporated in the voice signal.

Similarly, the process of detecting an ACK signal includes averaging the received voice signal over a period of 64 ms in the preferred embodiment. Then the averaged value of the voice signal (representing an estimate of the DC offset of the signal) is compared to the selected DC offset for the ACK signal, in the preferred embodiment, to −4096. When the estimated DC offset is about equal to the ACK DC offset (within +/−768 in the exemplary embodiment), the method (at steps 54, 66, and 76) indicates that it has detected an ACK signal incorporated in the voice signal.

As noted above, in the preferred embodiment the method also attempts to detect a Notch code in the voice signal. In order to prevent false detection of a HAIL signal, each VCU performing the method of the present invention also "notches" the voice signal where the Notch codes are mu-law or A-law values that are almost identical to the DC offset code that corresponds to the HAIL signal (+278). In particular, the method substitutes the value immediately below the HAIL offset with the next lower value when this value occurs in the signal. In addition, the method substitutes the value immediately above the HAIL offset with the next higher value when this value occurs in the signal; see TABLE 1 for the substitution values. Thus, in steps 64 and 76, the method determines whether the Notch code (0xE6 or 0xE7 for Mu-law, 0x44 or 0x45 for A-law) exists in the voice signal. When this code exists, the VCU that generated the voice signal can not be performing the tandem detection and tunneling method in accordance with the present invention since these codes are substituted as shown in TABLE 1.

TABLE 1

|  | Original Code | Substituted Code |
| --- | --- | --- |
| Mu-law | 0xE6 | 0xE5 |
|  | 0xE7 | 0xE8 |
| A-law | 0x44 | 0x43 |
|  | 0x45 | 0x46 |

As noted above, steps 68 to 118 of the method shown in FIG. 3 are used to perform the tandem tunneling procedure in accordance with the present invention. Steps 68 to 78 are used to ensure that the two VCUs that comprise the tandem link are synchronized prior to starting the tandem tunneling process in accordance with the present invention. In step 68, a 450 ms timer is started. Then an ACK signal is incorporated in the voice signal transmitted to the digital switch 30 via link 26 or 36. The ACK signal is generated to ensure that the other VCU 26, 36 in the tandem link has detected the ACK signal and entered the synchronization phase of the method. The method also checks to see if the notch code is present in the voice signal (step 74). As explained above, when the notch code exists in the voice signal received on link 26 or 36, VCU 24 or 34 can not be performing the same or similar method since this code is never transmitted as part of the voice signal in VCUs operating in accordance with the present invention. When the notch code is detected, the method returns to step 52.

Otherwise, the VCU 24 or 34 determines whether the voice signal still includes the ACK signal (step 76). When the voice signal generated by the other VCU 24 or 34 of the tandem link still includes the ACK signal the VCU has not timed out. When the voice signal does not include the ACK signal, the other VCU has timed out and the VCU should start the tandem tunneling procedure (step 82). When the voice signal still includes the ACK signal, the method determines whether the timer has reached 450 ms (step 78). When the timer has reached 450 ms, the VCU times out and starts the tandem tunneling procedure at step 82. Otherwise, the method returns to step 72 and continues to generate the ACK signal. Eventually, one of the two tandem VCUs will time out so the other VCU will not detect the ACK signal and continue the tandem tunneling initialization at step 82.

Figure 5A:
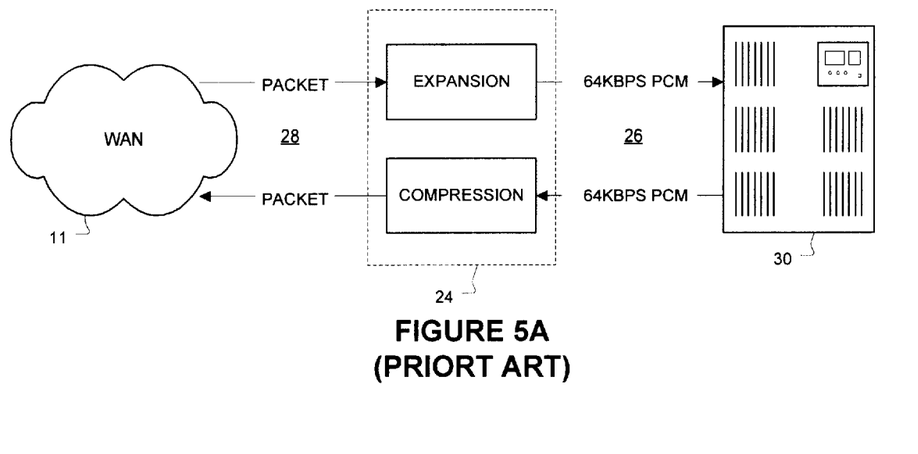
FIG. 5A (PRIOR ART) is a diagram of a voice conversion unit performing normal voice signal translation between a subscriber unit and a wide area network.

In steps 82 to 86, the VCU stops converting the voice signal received from the subscriber side 26, 36 to packets for transmission to the network 11, 21 via the network side link 28, 38. In normal voice processing operation as shown in FIG. 5A, the VCU receives packets that comprise a compressed voice signal via network link 28 (or 38) from WAN 11 (or 21) and expands (decompresses) the compressed voice signal into a 64 Kbps PCM Voice signal for transmission to the digital switch 30 via subscriber link 26 (or 36). In addition, VCU receives a 64 Kbps PCM voice signal from the digital switch 30 via subscriber side link 26 (or 36) and compresses the voice signal and converts the compressed voice signal into a plurality of packets (forming a packet signal) for transmission to the WAN 11, 21 via network link 28 (or 38).

Figure 5B:
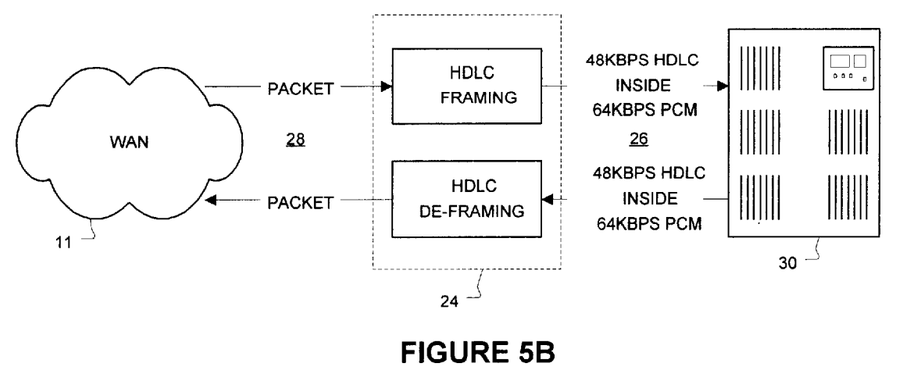
FIG. 5B is a diagram of a voice conversion unit performing tandem tunneling in accordance with the present invention between a subscriber unit and a wide area network.

When tandem tunneling is fully engaged (as shown in FIG. 5B), packets received from the WAN 11, 21 (which comprise a compressed voice signal) are not decompressed. Instead, a HDLC framing is applied to each packet, where each packet uses the 6 most significant bits (MSB) of each 8-bit byte of the 64 Kbps PCM signal within the digital path. Thus, the packet signal received on the network side link 28, 38 from the WAN 11, 21 is transmitted to the digital switch 30 after HDLC framing is applied to the packets. Likewise, when tandem tunneling is fully engaged, the digital switch 30 passes these HDLC framed packets (which contain the compressed voice) from the other VCU 34 or 24 of the tandem link. The VCU 24, 34 receives the HDLC framed packets from the digital switch 30 via subscriber link 26, 36 and removes the framing information to produce the packet signal originally created by VCU 44, 14 on network link 48, 18. Thus, only the original packets are transmitted by the VCU 24 and 34 when tandem tunneling is fully engaged. Consequently, voice signals transmitted on the voice communication link of the voice communication system 10 are compressed and decompressed only once even though the voice signal traverses multiple WAN 11, 21.

At step 82, a 450 ms timer is started and the ACK/HAIL is not generated in the voice signal and no packets are transmitted to the network 11 or 21 via link 28 or 38. The transmission of packets is blocked because in the next steps of the process, each VCU will start framing packets received from the WAN 11, 21 and providing these to the digital switch 30. Consequently, at some point the signal received from the digital switch 30 via link 26 or 36 will not longer be an uncompressed voice signal but a framed packet signal including a compressed voice signal. When the timer reaches 450 ms (step 86), the VCU 24 or 34 will start framing packets received from the network 11 or 21 via network link 28 or 38 and start a 1000 ms timer. Each VCU 24 and 34 will continue to stop processing the voice signal received from the digital switch 30 and thus will not generate packets for transmission to the network 11 or 21 (step 92).

Then the VCU attempts to detect whether the signal on the subscriber link 26 or 36 from the digital switch 30 includes a HDLC framed packet signal. When the VCU 24 or 34 detects the presence of a HDLC framed packet signal on the subscriber link 26 or 36, the process can progress closer to fully engaging tandem tunneling at step 98. Otherwise, the VCU 24, 34 continues to stop providing packets to the network 11, 21 via link 28, 38 at step 92 and continuing to attempt to detect a framed packet signal on link 26 or 36 from digital switch 30 (step 94). When the timer reaches 1000 ms before a framed packet signal is detected on link 26 or 36 from digital switch 30, then transition to tandem tunneling has failed and normal voice processing will be engaged gracefully by performing steps 114 to 118, which are explained in more detail below.

Otherwise, a final synchronization stage is performed for 600 ms prior to fully engaging tandem tunneling. A 600 ms timer is started (step 98). During this last synchronization stage, each VCU 24 or 34 continues to prevent to transmission of packets to WAN 11, 21 via link 28, 38. Each VCU 24 or 34 also continues HDLC framing packets received from the network 11, 21 via link 28, 36 and providing the HDLC framed packets to the digital switch 30 via link 26, 36 for transmission to the other VCU 34, 24. When the timer reaches 600 ms (step 104), then full tandem tunneling is engaged (step 106) until HDLC framing is no longer detected on link 26 or 36 (step 108).

As explained above with reference to FIG. 5B, during tandem tunneling packets received from the WAN 11, 21 (which comprise a compressed voice signal) are not decompressed. Instead, a HDLC framing is applied to each packet, where each packet uses the 6 most significant bits (MSB) of each 8-bit byte of the 64 Kbps PCM signal within the digital path. Thus, the packet signal received on the network side link 28, 38 from the WAN 11, 21 is transmitted to the digital switch 30 after HDLC framing is applied to the packets. Likewise, when tandem tunneling is fully engaged, the digital switch 30 provides HDLC framed packets (including compressed voice) from the other VCU 34 or 24 of the tandem link. The VCU 24, 34 receives the HDLC framed packets from the digital switch 30 via subscriber link 26, 36 and removes the framing information to produce the packet signal originally created by VCU 44, 14 on network link 48, 18. Thus, only the original packets are transmitted by the VCU 24 and 34 when tandem tunneling is fully engaged. Consequently, voice signals transmitted on the voice communication link of the voice communication system 10 are compressed and decompressed only once even though the voice signal traverses multiple WAN 11, 21.

Tandem tunneling (step 106) continues until HDLC framing is no longer detected on the voice signal received from the subscriber side 26, 28 (step 108). When HDLC framing is no longer detected on the voice signal received from the subscriber side 26, 28, VCU 24, 34 will transition back to normal voice processing. In order to transition gracefully (without noticeable voice artifacts), the VCU 24, 34 stops processing signals received from the subscriber side link 26, 28 and also stops processing packets received from the network 24, 34 on network link 28, 38 for 1000 ms. Accordingly, the VCU 24, 34 does not transmit any signals for 1000 ms (steps 112, 114, 116). When the timer reaches 1000 ms (step 116), the VCU 24, 34 starts normal voice processing as shown in FIG. 5A (step 118) and starts the tandem detection process again at step 52.

Figure 4:
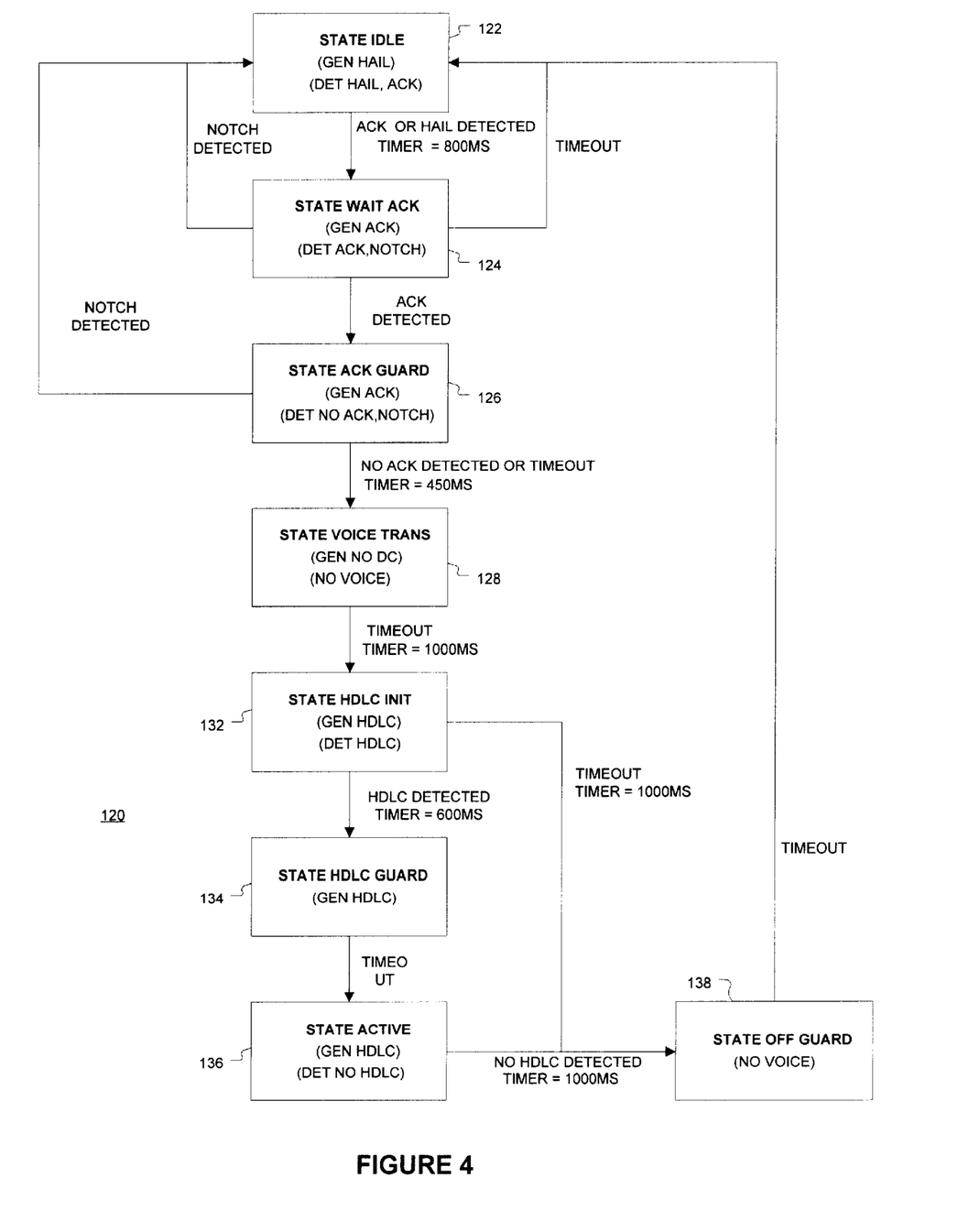
FIG. 4 is a state diagram for a VCU performing the method shown in FIG. 3.
Figure 6:
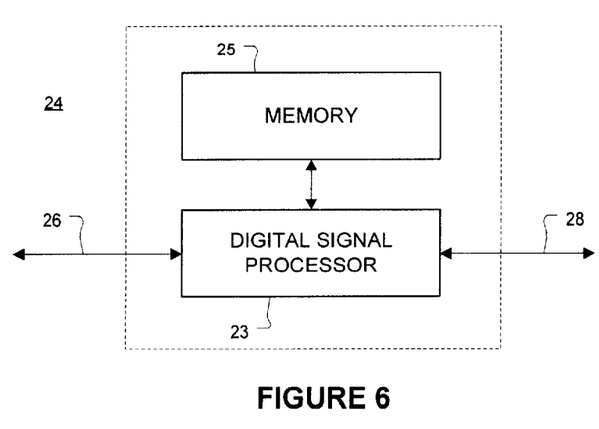
FIG. 6 is a diagram of an exemplary VCU in accordance with the present invention for performing the method depicted in FIG. 3 and following the state diagram shown in FIG. 4.

A configuration of a VCU 24 in accordance with the present invention is presented with reference to FIGS. 4 and 6. FIG. 6 is a diagram of an exemplary VCU 24 where the VCU 24 includes a Digital Signal Processor ("DSP") 23 and memory storage unit 25. The DSP 23 performs the operations of the state diagram 120 shown in FIG. 4. The memory storage unit 25 may store instructions for performing the functions of the state diagram 120 (where the state diagram 120 corresponds to the method 50 shown in FIG. 3) and data signals. The memory storage unit 25 may be any device capable of storing information including a Random Access Memory (RAM), disk drive, diskette drive, writeable CDROM, magnetic tape drive or other device. The DSP 23 may be any processor having sufficient instruction speed to perform the operations described above in relation to the method 50 and shown in the state diagram 120 (FIG. 4).

The state diagram 120 is another depiction of the preferred process of the present invention. In particular, the first state, State Idle 122 of the diagram 120 corresponds to steps 52 to 54 of the method 50. In particular, during this state the VCU 24 generates the HAIL signal and remains in this state until a HAIL or ACK signal is detected in the voice signal received on link 26. Then the state changes to State Wait ACK 124. State Wait ACK 124 corresponds to steps 56 to 66 of the method 50. During this state 124, a 800 ms timer is started and the VCU adds the ACK signal to the voice signal generated on link 26 until the timer reaches 800 ms, a notch code is detected in the voice signal received on link 26, or an ACK signal is detected in the voice signal received on link 26. When a notch code is detected or the timer reaches 800 ms, the state returns to State Idle 122. When an ACK signal is detected in the voice signal received on link 26, the state changes to State ACK guard 126. At this point, a tandem link between the VCU 24 and another VCU has been detected.

State ACK Guard 126 corresponds to steps 68 to 78 of the method 50. During this state an ACK signal is added to the voice signal generated on link 26 until a timer reaches 450 ms, a notch code is detected in the voice signal received on link 26, or an ACK signal is not detected in the voice signal received on link 26. This state is used to synchronize the two VCUs that comprise the tandem link. When a notch code is detected, the state returns to State Idle 122. When an ACK signal is not detected in the voice signal received on link 26 or the timer reaches 450 ms, the state changes to State Voice Transition 128.

State Voice Transition 128 corresponds to steps 82 to 86 of the method 50. During this state packets are not transmitted to the network link 28 and the HAIL/ACK signal is not added to the voice signal on link 26 for a period of 450 ms. After 450 ms, the state changes to State HDLC Init 132. State HDLC Init 132 corresponds to steps 88 to 96 of the method 50. During this state, HDLC framing of packets received on line 28 is initialized and packets are not transmitted to the network link 28 for a period of 1000 ms. This state 132 along with the previous state 128 prevents the VCU from processing the voice signal received on link 26 since this signal may contain a HDLC framed packet signal or a PCM voice signal. After the period of 1000 ms, the state is changed to State HDLC Guard 134.

State HDLC Guard 134 corresponds to steps 98 to 104 of the method 50. During this state, HDLC framing of packets received on line 28 is continued and packets are not transmitted to the network link 28 for a period of 600 ms. This state 134 along with the previous states 132 and 128 prevents the VCU from processing the voice signal received on link 26 since this signal may contain a HDLC framed packet signal or a PCM voice signal. This state is the final state before full tandem tunneling is engaged. After the period of 600 ms, the state is changed to State Active 136.

State Active 136 corresponds to steps 106 to 108 of the method 50. During this state, tandem tunneling is fully engaged. Packets received on link 28 are framed and transmitted on link 26 as a 48 Kbps data stream within a 64 Kbps PCM signal. Framed packets received on link 26 are de-framed and transmitted as a packet signal on link 28. This state remains active until framed packets on link 26 are no longer detected. When framed packets are not detected, the state changes to State Off Guard 138. State Off Guard 138 corresponds to steps 112 to 118 of the method 50. During this state, the VCU 24 does not transmit a packet signal to link 28 or a voice signal to link 26 for a period of 1000 ms. After the period of 1000 ms is over, VCU 24 resumes normal voice processing where packets received on link 28 are decompressed into a 64 Kbps PCM signal and transmitted on link 26 and the PCM voice signal received on link 26 is compressed and converted into a packet signal transmitted on link 28.

It is noted that variations of the above techniques are possible. Different time outs may be employed in the method and states may be removed while still enabling tandem tunneling. In addition, the detection and removal of a Notch code is not required to detect a tandem link and enable tandem tunneling. Consequently, the invention is not to be limited by the specific illustrated embodiment, but only by the scope of the appended claims.

What is claimed is:

1. A method of determining whether a voice communication link between a first subscriber unit and a second subscriber unit in a voice communication system includes a tandem link, the first and second subscriber units transmitting and receiving a voice signal on the voice communication link and the voice communication system including a plurality of voice conversion units where each of the plurality of voice conversion units has a subscriber side link and network side link, the method comprising each of the plurality of voice conversion units performing the steps of:

a) adding a HAIL signal to the voice signal provided on the subscriber side link;

b) detecting a HAIL signal or an ACK signal in the voice signal received on the subscriber side link; and c) adding an ACK signal to the voice signal provided on the subscriber side link when a HAIL signal or an ACK signal is detected on the voice signal received on the subscriber side link, d) wherein a tandem link is detected when an ACK signal is detected in the voice signal received on the subscriber side link.

2. The method according to claim 1, wherein each of the plurality of voice conversion units further performing the step of detecting a ACK signal in the voice signal received on the subscriber side link after performing step c) and wherein a tandem link is detected when an ACK signal is detected in the voice signal received on the subscriber side link after step c) is performed.

3. The method according to claim 1, herein each of the plurality of voice conversion units further performing the step of detecting a ACK signal in the voice signal received on the subscriber side link after performing step c) and wherein a tandem link is detected when an ACK signal is detected in the voice signal received on the subscriber side link within a predetermined period of time after step c) is performed.

4. The method according to claim 1, wherein each of the plurality of voice conversion units further performing the steps of:
   a) detecting whether the voice signal generated to the subscriber side link includes a notch code;
   b) removing the notch code from the voice signal generated to the subscriber side link when the notch code is detected in the voice signal generated to the subscriber side link and providing the modified voice signal on the subscriber side link; and
   c) detecting whether the voice signal received on the subscriber side link includes a notch code,
   d) wherein a tandem link is not detected when a notch code is detected in the voice signal received on the subscriber side link.

5. The method according to claim 4, wherein each of the plurality of voice conversion units further performing the step of detecting a ACK signal in the voice signal received on the subscriber side link after performing step c) and wherein a tandem link is detected when an ACK signal is detected in the voice signal received on the subscriber side link after step c) is performed.

6. The method according to claim 4, wherein each of the plurality of voice conversion units further performing the step of detecting a ACK signal in the voice signal received on the subscriber side link after performing step c) and wherein a tandem link is detected when an ACK signal is detected in the voice signal received on the subscriber side link within a predetermined period of time after step c) is performed.

7. The method according to claim 1, wherein step a) includes adding a first predetermined DC offset to the voice signal provided on the subscriber side link to add a HAIL signal to voice signal provided on the subscriber side link.

8. The method according to claim 7, wherein step c) includes adding a second predetermined DC offset to the voice signal provided on the subscriber side link to add a ACK signal to voice signal provided on the subscriber side link.

9. The method according to claim 8, wherein the first predetermined DC offset is a positive DC offset and the second predetermined DC offset is a negative DC offset.

10. The method according to claim 8, wherein step b) includes the steps of:
   i) averaging the voice signal received on the subscriber side link for a predetermined interval of time;
   ii) comparing the averaged value of the voice signal received on the subscriber side link with the first predetermined DC offset; and
   iii) detecting a HAIL signal in the voice signal received on the subscriber side link when the averaged value of the voice signal received on the subscriber side link is substantially the same as the first predetermined DC offset.

11. The method according to claim 10, wherein step b) further includes the steps of:
   i) averaging the voice signal received on the subscriber side link for a predetermined interval of time;
   ii) comparing the averaged value of the voice signal received on the subscriber side link with the second predetermined DC offset; and
   iii) detecting an ACK signal in the voice signal received on the subscriber side link when the averaged value of the voice signal received on the subscriber side link is substantially the same as the second predetermined DC offset.

12. The method according to claim 4, wherein step a) includes adding a first predetermined DC offset to the voice signal provided on the subscriber side link to add a HAIL signal to voice signal provided on the subscriber side link.

13. The method according to claim 12, wherein step c) includes adding a second predetermined DC offset to the voice signal provided on the subscriber side link to add a ACK signal to voice signal provided on the subscriber side link.

14. The method according to claim 13, wherein the first predetermined DC offset is a positive DC offset and the second predetermined DC offset is a negative DC offset.

15. The method according to claim 14, wherein step b) includes the steps of:
   i) averaging the voice signal received on the subscriber side link for a predetermined interval of time;
   ii) comparing the averaged value of the voice signal received on the subscriber side link with the first predetermined DC offset; and
   iii) detecting a HAIL signal in the voice signal received on the subscriber side link when the averaged value of the voice signal received on the subscriber side link is substantially the same as the first predetermined DC offset.

16. The method according to claim 15, wherein step b) further includes the steps of:
   i) averaging the voice signal received on the subscriber side link for a predetermined interval of time;
   ii) comparing the averaged value of the voice signal received on the subscriber side link with the second predetermined DC offset; and
   iii) detecting an ACK signal in the voice signal received on the subscriber side link when the averaged value of the voice signal received on the subscriber side link is substantially the same as the second predetermined DC offset.

17. The method according to claim 16, wherein the Notch code is the PCM code that most closely corresponds to the first predetermined DC offset.

18. A method of preventing a tandem link in a voice communication link between a first subscriber unit and a second subscriber unit in a voice communication system, the first and second subscriber units transmitting and receiving a voice signal on the voice communication link and the voice communication system including a plurality of voice conversion units where each of the plurality of voice conversion units has a subscriber side link and network side link, the method comprising the steps of:
   a) determining whether any two of the plurality of voice conversion units form a tandem link;
   b) passing compressed voice signals received on the network side of each of the two of the plurality of voice conversion units that form the tandem link to the corresponding subscriber side of the two of the plurality of voice conversion units that form a tandem link; and c) passing compressed voice signals received on the subscriber side of each of the two of the plurality of voice conversion units that form the tandem link to the corresponding network side of the two of the plurality of voice conversion units that form a tandem link.

19. The method according to claim 18, wherein step a) includes determining whether any two of the plurality of voice conversion units are coupled together at their subscriber side.

20. The method according to claim 18, wherein step a) includes each of the plurality of voice conversion units performing the steps of:
   i) adding a HAIL signal to the voice signal provided on the subscriber side link;
   ii) detecting a HAIL signal or an ACK signal in the voice signal received on the subscriber side link; and
   iii) adding an ACK signal to the voice signal provided on the subscriber side link when a HAIL signal or an ACK signal is detected on the voice signal received on the subscriber side link,
   iv) wherein a tandem link is detected between two of the plurality of voice conversion units when an ACK signal is detected in the voice signal received on the subscriber side link of one of the plurality of voice conversion units from another of the plurality of voice conversion units.

21. The method according to claim 20, wherein each of the plurality of voice conversion units further performing the step of detecting a ACK signal in the voice signal received on the subscriber side link after performing step iii) and wherein a tandem link is detected when an ACK signal is detected in the voice signal received on the subscriber side link after step iii) is performed.

22. The method according to claim 20, wherein each of the plurality of voice conversion units further performing the step of detecting a ACK signal in the voice signal received on the subscriber side link after performing step iii) and wherein a tandem link is detected when an ACK signal is detected in the voice signal received on the subscriber side link within a predetermined period of time after step iii) is performed.

23. The method according to claim 20, wherein each of the plurality of voice conversion units further performing the steps of:
   v) detecting whether the voice signal generated to the network side link includes a notch code;
   vi) removing the notch code from voice signal generated to the network side link when the notch code is detected in the voice signal generated to the network side link and providing the modified voice signal on the subscriber side link; and
   vii) detecting whether the voice signal received on the subscriber side link includes a notch code,
   viii) wherein a tandem link is not detected when a notch code is detected in the voice signal received on the subscriber side link.

24. The method according to claim 23, wherein each of the plurality of voice conversion units further performing the step of detecting a ACK signal in the voice signal received on the subscriber side link after performing step iii) and wherein a tandem link is detected when an ACK signal is detected in the voice signal received on the subscriber side link after step iii) is performed.

25. The method according to claim 23, wherein each of the plurality of voice conversion units further performing the step of detecting a ACK signal in the voice signal received on the subscriber side link after performing step iii) and wherein a tandem link is detected when an ACK signal is detected in the voice signal received on the subscriber side link within a predetermined period of time after step iii) is performed.

26. The method according to claim 20, wherein step i) includes adding a first predetermined DC offset to the voice signal provided on the subscriber side link to add a HAIL signal to voice signal provided on the subscriber side link.

27. The method according to claim 26, wherein step iii) includes adding a second predetermined DC offset to the voice signal provided on the subscriber side link to add a ACK signal to voice signal provided on the subscriber side link.

28. The method according to claim 27, wherein the first predetermined DC offset is a positive DC offset and the second predetermined DC offset is a negative DC offset.

29. The method according to claim 27, wherein step ii) includes the steps of:
   a) averaging the voice signal received on the subscriber side link for a predetermined interval of time;
   b) comparing the averaged value of the voice signal received on the subscriber side link with the first predetermined DC offset; and
   c) detecting a HAIL signal in the voice signal received on the subscriber side link when the averaged value of the voice signal received on the subscriber side link is substantially the same as the first predetermined DC offset.

30. The method according to claim 29, wherein step ii) further includes the steps of:
   a) averaging the voice signal received on the subscriber side link for a predetermined interval of time;
   b) comparing the averaged value of the voice signal received on the subscriber side link with the second predetermined DC offset; and
   c) detecting an ACK signal in the voice signal received on the subscriber side link when the averaged value of the voice signal received on the subscriber side link is substantially the same as the second predetermined DC offset.

31. The method according to claim 23, wherein step i) includes adding a first predetermined DC offset to the voice signal provided on the subscriber side link to add a HAIL signal to voice signal provided on the subscriber side link.

32. The method according to claim 31, wherein step iii) includes adding a second predetermined DC offset to the voice signal provided on the subscriber side link to add a ACK signal to voice signal provided on the subscriber side link.

33. The method according to claim 32, wherein the first predetermined DC offset is a positive DC offset and the second predetermined DC offset is a negative DC offset.

34. The method according to claim 33, wherein step ii) includes the steps of:
   a) averaging the voice signal received on the subscriber side link for a predetermined interval of time;
   b) comparing the averaged value of the voice signal received on the subscriber side link with the first predetermined DC offset; and
   c) detecting a HAIL signal in the voice signal received on the subscriber side link when the averaged value of the voice signal received on the subscriber side link is substantially the same as the first predetermined DC offset.

* * * * *